Jan. 25, 1966    W. H. TOMB ETAL    3,231,298
PIPE COUPLING

Filed Nov. 7, 1963    2 Sheets-Sheet 1

INVENTORS.
William H. Tomb
Anthony R. Zine, Jr.
BY
Clarence R. Patty Jr.
ATTORNEY Jan. 25, 1966  W. H. TOMB ETAL  3,231,298
PIPE COUPLING
Filed Nov. 7, 1963  2 Sheets-Sheet 2

INVENTORS.
William H. Tomb
Anthony R. Zine, Jr.
BY
Clarence R Patty
ATTORNEY

United States Patent Office 3,231,298
Patented Jan. 25, 1966

3,231,298
PIPE COUPLING
William H. Tomb and Anthony R. Zine, Jr., Corning, N.Y., assignors to Corning Glass Works, Corning, N.Y., a corporation of New York
Filed Nov. 7, 1963, Ser. No. 322,129
4 Claims. (Cl. 285—233)

This invention relates to pipe couplings and more particularly to couplings adapted to join the beaded or tooled ends of sections of glass pipe.

It is an object of the present invention to provide a pipe coupling which is both inexpensive and easily assembled by hand without the assistance of tools of any kind.

Another object is the provision of such a coupling which is capable of maintaining a fluid-tight seal when the interiors of the joined pipe sections are subjected to pressures either substantially above or substantially below that of the ambient atmosphere.

Another object is to provide a pipe coupling that can be easily disassembled for inspection or replacement.

Another object is the provision of a pipe coupling including means for storing therein energy which is releasable during operation to allow relative movement of the coupling components.

Another object is the provision of a coupling which provides means for limiting the bending moment which a system including such a coupling is required to withstand.

These and other objects, which will be apparent from the detailed description of the invention, are accomplished, according to one embodiment thereof, by the provision of a pipe coupling comprising a gasket between the joined ends of two sections of pipe, a band comprising two segments adapted to force the ends of the pipe sections against the gasket and two spring clips holding the band segments together about the ends of the pipe sections.

The invention will be described with reference to the accompanying drawing, in which.

Figure 3:
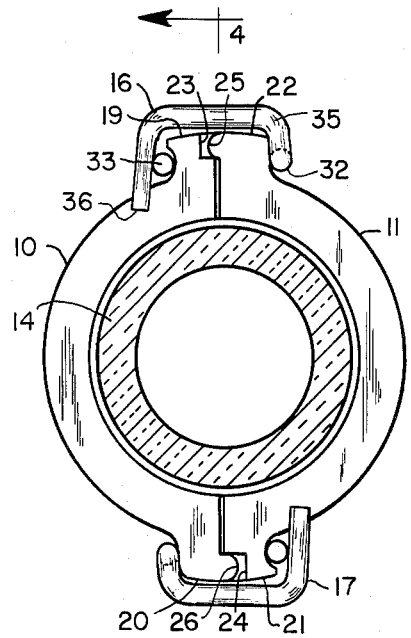
FIGURE 3 is a sectional view taken on line 3—3 of FIGURE 1.
Figure 4:
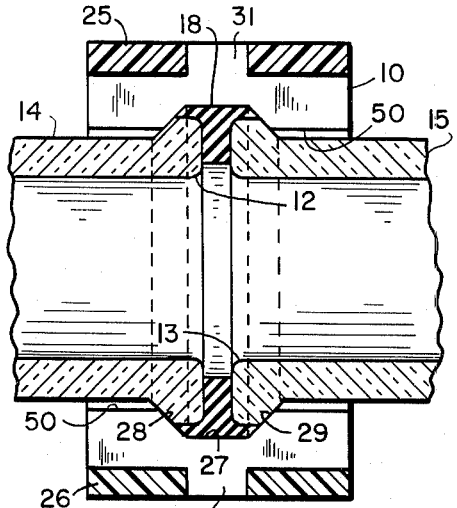
Figure 5:
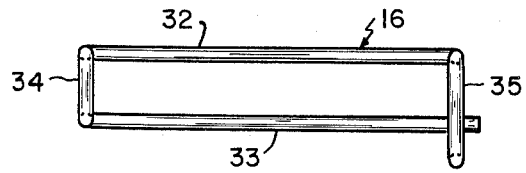
Figure 6:
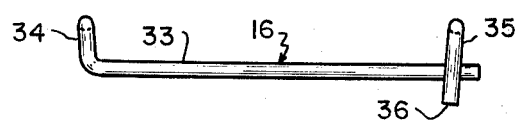
Figure 7:
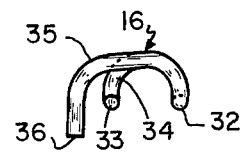
Figure 8:
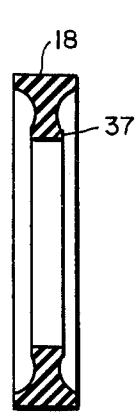
Figure 9:
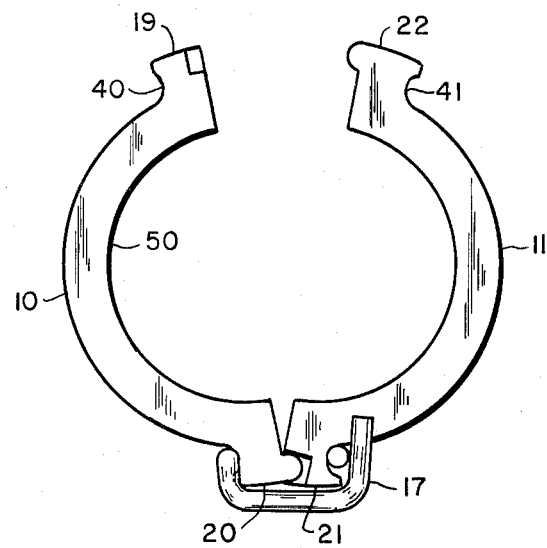

FIGURE 4 is a sectional view of part of the coupling taken on line 4—4 of FIGURE 3, FIGURE 5 is a top view of the spring clip employed in the present coupling, FIGURE 6 is a side view of the spring clip of FIGURE 5, FIGURE 7 is an end view of the spring clip of FIGURE 5, FIGURE 8 is a sectional view taken through a gasket of the present coupling in its uncompressed state, and FIGURE 9 is an end view of the band segments of the present coupling at an intermediate stage of assembly.

Referring to the drawing, the coupling of the present invention comprises two semicircular band segments 10 and 11, which are clamped about the tooled ends 12 and 13 of pipe sections 14 and 15, respectively, by means of spring clips 16 and 17. The ends of the pipe sections bear against rubber gasket 18.

Band segments 10 and 11 are identical to one another. Each band segment is formed of molded plastic and has a generally semicylindrical outer surface provided at its edges with longitudinally extending ridges. Ridges 19 and 20 of segment 10 are identical, respectively, to ridges 21 and 22 of segment 11. The transition areas between the cylindrical surface of each band segment and the respective ridges of the segment are generally concave in form in order to permit the seating of the appropriate portions of the spring clips therein. Ridges 19 and 21 are provided with longitudinal grooves 23 and 24 into which fit longitudinal lugs 25 and 26 of ridges 22 and 20, respectively, as illustrated in FIGURE 3.

Figure 1:
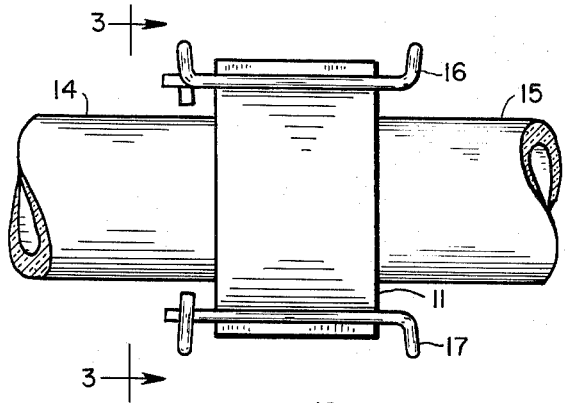
FIGURE 1 is a side elevational view of a coupling according to the invention.
Figure 2:
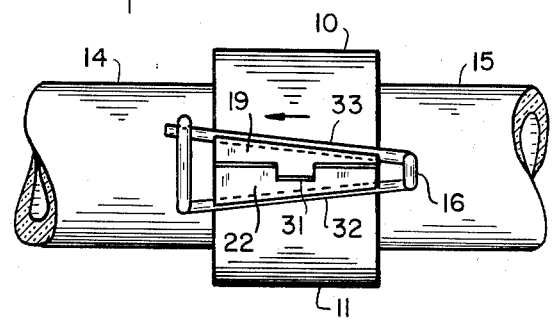
FIGURE 2 is a top view of the coupling of FIGURE 1.

The ridges of the band segments, such as ridges 19 and 22 illustrated in FIGURE 2, are generally wedge-shaped, the wedges which form the two ridges of a band segment tapering so as to decrease in width in the same longitudinal direction, thereby causing the respective segments to be drawn together when spring clips 16 and 17 are drawn around the ridges. The effect of the radial force provided by the clips drawing the band segments together is translated into an axial force which tends to draw the pipe sections together against gasket 18. Such translation is effected by means of channels, such as channel 27 of band segment 10, illustrated in FIGURE 4. Channel 27 has sloping edge surfaces 28 and 29, which are generally complementary to and engage the flared ends 12 and 13 of the sections of glass pipe. Due to the slope of these channel edge surfaces, when the band segments are tightened radially about the ends of the pipe sections, edge surfaces 28 and 29 exert on the flared portions of the pipe ends forces which have components in the axial direction with respect to the pipe sections, which components tend to force the pipe ends against gasket 18 and to compress the gasket. In order to facilitate assembly of the present coupling by preventing relative axial movement between band segments 10 and 11, lugs 25 and 26 thereof are provided with radially extending grooves, such as groove 30 of lug 26 of FIGURE 4, and grooves 23 and 24 of band segments 10 and 11 are provided with radially extending tongues, such as tongue 31, illustrated in FIGURES 2 and 4. The manner in which the tongues and grooves interlock to prevent relative axial movement between the band segments is illustrated in FIGURE 2.

The spring clips of the present invention are identical to one another, and each clip, such as clip 16, illustrated in FIGURES 5–7, comprises two band-engaging portions 32 and 33, which are generally parallel to one another in their unstressed state and are separated by a distance smaller than the sum of the widths of the two adjoining band segment ridges at the narrower ends of the ridges. Each clip is a continuous wire of stainless steel, and ridge-engaging portions 32 and 33 are connected by clip trailing portion 34, which is in the form of an arc extending transversely away from the plane of portions 32 and 33. Connected to ridge-engaging portion 32 is a clip leading portion 35, which is in the form of a second curve extending transversely away from the plane of portions 32 and 33 and in the same direction as that of clip trailing portion 34. Ridge-engaging portion 33 of the clip extends to a point within the curve of clip leading portion 35, and tip 36 of clip leading portion 35 passes through the plane of portions 32 and 33. Thus, when clip 16 is drawn around ridges 19 and 22, as illustrated in FIGURE 3, ridge-engaging portions 32 and 33 are forced apart by the ridges until the free end of portion 33 engages tip 36. At this point, the clip is tightly engaged with ridges 19 and 22, and further force exerted in the direction of the arrow of FIGURE 2 will urge the band ridges toward one another. Due to the fact that the structure of clip 16 is resilient, as the clip is drawn over the band and around the ridges, tip 36 slides along the outer surface of the band, and, after it has passed beyond the end of the band, snaps into the position illustrated in FIGURE 3, thus locking the clip in place.

As previously mentioned, one side of each ridge of the band segments of the present coupling forms a concave transition area between the ridge and the outer surface of the band segment, such as transition areas 40 and 41 of ridges 19 and 22 of FIGURE 9. In addition, the edges of the ridges which edges oppose one another when the coupling is assembled are formed with either grooves or lugs having rounded surfaces. The purpose of such configuration is to permit two band segments to be held together during assembly of the coupling by only one clip. This arrangement, illustrated in FIGURE 9, permits easy assembly of the coupling, since it permits the band segments to be held in the relative positions illustrated in FIGURE 9 by one hand while the pipe ends are inserted therein with the other hand. Subsequently, the pipe sections and band segments can be held with one hand while the second clip is placed in position around the remaining pair of ridges.

As illustrated in FIGURE 8, gasket 18 is provided with an enlarged annular portion 37 along its inner periphery in order to effect increased pressure between the pipe ends and the gasket at the inner periphery of the juncture therebetween, thus increasing the pressures which the coupling is capable of withstanding, and providing increased resistance to the deposition between the gasket and the pipe ends of substances carried in the pipe system.

Both band segments employed in the present coupling are identical to one another. Similarly, the spring clips employed in the coupling are identical to one another. Although this arrangement is not essential, it will be appreciated that the interchangeability provided thereby adds to the ease of assembling the coupling, since there is no need to search for mating parts. In addition, such arrangement contributes to economy of manufacture.

It will be seen from examination of FIGURE 2 that the respective band segments preferably do not tightly abut one another along their longitudinal edges when the coupling is assembled, but that preferably there exists therebetween a longitudinal space which permits the spring clips to maintain a resilient connection between the band segments to compensate for cold flow of the gasket. Similarly, the provision of such resiliency makes preferable the existance of an annular space between the inner surface 50 of the band segments and the outer surfaces of the pipe sections, as shown in FIGURE 4, in order to permit relative radial movement therebetween.

It will be appreciated that variations may be made from the coupling illustrated herein as the preferred embodiment of the present invention. Accordingly, it is intended that the scope of the present invention be defined only by the appended claims.

We claim:

1. A coupling joining two sections of pipe having ends with outwardly flared outer surfaces, said coupling comprising a gasket between said ends, band segments opposed to one another along paired longitudinal edges and forming together a band generally surrounding said pipe ends and having an inner surface bearing upon said flared outer surfaces of said ends of said pipe sections, each said band segment having on its outer surface in the vicinity of each of its said paired longitudinal edges an outwardly projecting ridge, a spring clip spanning each pair of said ridges in the vicinity of said paired longitudinal edges, each said spring clip comprising first and second ridge-engaging portions each engaging one ridge of said pair of said ridges and urging said pair of said ridges together at opposing edges thereof to hold said band segments about said ends of said pipe sections, said ridge-engaging portions being joined at first ends thereof, one of said first and second ridge-engaging portions having extending from its remaining end a third portion extending in a curve concave along its edge nearest said pipe sections and having a tip which engages the other of said first and second ridge-engaging portions to maintain said first and second ridge-engaging portions clamped about said ridges, said tip extending beyond said other of said first and second ridge-engaging portions by an amount sufficient to cause said tip to engage said band when said clip is moved in a direction parallel to the axes of said pipe sections and in the direction of said first ends, said ridges being generally wedge-shaped and joining the outer surfaces of said band segments to form concave junctures, said ridge-engaging portions of said clips being located in said junctures, said wedge-shaped ridges having their narrower ends adjacent one another, and said first ends of said ridge-engaging portions being nearer said narrower ends of said ridges.

2. A coupling joining two sections of pipe having ends with outwardly flared outer surfaces, said coupling comprising a gasket between said ends, band segments opposed to one another along paired longitudinal edges and forming together a band generally surrounding said pipe ends and having an inner surface bearing upon said flared outer surfaces of said ends of said pipe sections, each said band segment having on its outer surface in the vicinity of each of its said paired longitudinal edges an outwardly projecting ridge, a spring clip spanning each pair of said ridges in the vicinity of said paired longitudinal edges, each said spring clip comprising first and second ridge-engaging portions each engaging one ridge of said pair of said ridges and urging said pair of said ridges together at opposing edges thereof to hold said band segments about said ends of said pipe sections, said ridge-engaging portions being joined at first ends thereof, one of said first and second ridge-engaging portions having extending from its remaining end a third portion extending in a curve concave along its edge nearest said pipe sections and having a tip which engages the other of said first and second ridge-engaging portions to maintain said first and second ridge-engaging portions clamped about said ridges, said tip extending beyond said other of said first and second ridge-engaging portions by an amount sufficient to cause said tip to engage said band when said clip is moved in a direction parallel to the axes of said pipe sections and in the direction of said first ends, said ridges being generally wedge-shaped and joining the outer surfaces of said band segments to form concave junctures, said ridge-engaging portions of said clips being located in said junctures, said wedge-shaped ridges having their narrower ends adjacent one another, said first ends of said ridge-engaging portions being nearer said narrower ends of said ridges, one of said ridges of each said band segment having a lug on its said opposing edge and the other said ridge having a groove in its said opposing edge, said band segments being joined with each said lug of each said band segment being inserted in a groove of another said band segment so as to prevent axial movement of said band segments relative to one another.

3. A coupling joining two sections of pipe having ends with outwardly flared outer surfaces, said coupling comprising a gasket between said ends, band segments opposed to one another along paired longitudinal edges and forming together a band generally surrounding said pipe ends and having an inner surface bearing upon said flared outer surfaces of said pipe sections, each said band segment having on its outer surface in the vicinity of each of its said longitudinal edges an outwardly projecting ridge, a spring clip spanning each pair of said ridges in the vicinity of said paired longitudinal edges, each said spring clip comprising first and second ridge-engaging portions engaging one ridge of said pair of said ridges and urging said pair of said ridges together at opposing edges thereof to hold said band segments about said ends of said pipe sections, said ridge-engaging portions being joined at first ends thereof, one of said first and second ridge-engaging portions having extending from its remaining end a third portion extending in a curve concave along its edge nearest said pipe sections and having a tip which engages the other of said first and second ridge-engaging portions to maintain said first and second ridge-engaging portions tightly clamped about said ridges, said tip extending beyond said other of said first and second ridge-engaging portions by an amount sufficient to cause said tip to engage said band when said clip is moved in a direction parallel to the axes of said pipe sections and in the direction of said first ends, said ridges being generally wedge-shaped and joining the outer surfaces of said band segments to form concave junctures, said ridge-engaging portions of said clips being located in said junctures, said wedge-shaped ridges having their narrower ends adjacent to one another, said first ends of said ridge-engaging portions being nearer said narrower ends of said ridges, one of said ridges of each said band segment having a lug on its said opposing edge and the other said ridge having a groove in its said opposing edge, said band segments being joined with each said lug of each said band segment being inserted in a groove of another said band segment so as to prevent axial movement of said band segments relative to one another, said opposing edge of one said ridge of each band segment having a tongue which extends along said edge and said opposing edge of the other said ridge of said same band segment having a second groove which extends along said edge, said band segments being joined with each said tongue of each said segment located in said second groove of an opposing segment.

4. A coupling joining two sections of pipe having ends with outwardly flared outer surfaces, said coupling comprising a gasket between said ends, band segments opposed to one another along paired longitudinal edges and forming together a band generally surrounding said pipe ends and having an inner surface bearing upon said flared outer surfaces of said pipe sections, each said band segment having on its outer surface in the vicinity of each of its said longitudinal edges an outwardly projecting ridge, a spring clip spanning each pair of said ridges in the vicinity of said paired longitudinal edges, each said spring clip comprising first and second ridge-engaging portions engaging one ridge of said pair of said ridges and urging said pair of said ridges together at opposing edges thereof to hold said band segments about said ends of said pipe sections, said ridge-engaging portions being joined at first ends thereof, one of said first and second ridge-engaging portions having extending from its remaining end a third portion extending in a curve concave along its edge nearest said pipe sections and having a tip which engages the other of said first and second ridge-engaging portions to maintain said first and second ridge-engaging portions tightly clamped about said ridges, said tip extending beyond said other of said first and second ridge-engaging portions by an amount sufficient to cause said tip to engage said band when said clip is moved in a direction parallel to the axes of said pipe sections and in the direction of said first ends, said ridges being generally wedge-shaped and joining the outer surfaces of said band segments to form concave junctures, said ridge-engaging portions of said clips being located in said junctures, said wedge-shaped ridges having their narrower ends adjacent to one another, said first ends of said ridge-engaging portions being nearer said narrower ends of said ridges, one of said ridges of each said band segment having a lug at its said opposing edge and the other said ridge having a groove in its said opposing edge, said band segments being joined with each said lug of each said band segment being inserted in said groove of another said band segment so as to prevent axial movement of said band segments relative to one another, said opposing edge of one said ridge of each said band segment having a tongue which extends along said edge and said opposing edge of the other said ridge of the same band segment having a second groove which extends along said edge, said band segments being joined with each said tongue of each said segment located in said second groove of an opposing segment, at least one of said pairs of longitudinal edges of said band segments being separated by a space, and said inner surfaces of said band segments bearing upon only said flared surfaces of said pipe sections.

References Cited by the Examiner

UNITED STATES PATENTS

| | | | |
|---|---|---|---|
| 813,674 | 2/1906 | Skirrow | 285—419 X |
| 883,220 | 3/1908 | Middlebrook | 285—189 X |
| 1,128,080 | 2/1915 | Van Meter | 285—420 X |
| 1,290,590 | 1/1919 | Lehew | 285—409 |
| 1,325,530 | 12/1919 | Ore. | |
| 1,914,790 | 6/1933 | Rupert | 285—373 |
| 2,219,161 | 10/1940 | Jacobs | 285—365 |
| 2,403,839 | 7/1946 | Adolph | 285—419 X |
| 3,084,959 | 4/1963 | Stanton | 285—233 |

FOREIGN PATENTS

| | | |
|---|---|---|
| 378,640 | 8/1907 | France. |

CARL W. TOMLIN, *Primary Examiner.*